United States Patent [19]

Noll et al.

[11] 4,289,827
[45] Sep. 15, 1981

[54] MOISTURE HARDENING ONE-COMPONENT LACQUERS AND A PROCESS FOR COATING LEATHER

[75] Inventors: Klaus Noll, Cologne; Wolfgang Speicher, Leverkusen; Josef Pedain, Cologne; Rosemarie Schmid, Leverkusen, all of Fed. Rep. of Germany

[73] Assignee: Bayer Aktiengesellschaft, Leverkusen, Fed. Rep. of Germany

[21] Appl. No.: 123,854

[22] Filed: Feb. 22, 1980

[30] Foreign Application Priority Data

Mar. 6, 1979 [DE] Fed. Rep. of Germany ....... 2908628

[51] Int. Cl.$^3$ ............................................. B32B 27/40
[52] U.S. Cl. ................................. 428/423.4; 427/389; 427/391; 427/393.5; 428/473; 428/423.1; 528/66
[58] Field of Search .................... 427/389, 391, 393.5; 428/423.4, 473, 422.8, 904, 425.1, 423.1; 528/66

[56] References Cited

U.S. PATENT DOCUMENTS

| | | | |
|---|---|---|---|
| 3,247,827 | 4/1966 | Weber, Jr. | 428/423.4 X |
| 3,428,609 | 2/1969 | Chilvers et al. | 428/423.4 X |
| 3,457,225 | 7/1969 | Damusis. | |
| 3,687,605 | 8/1972 | Farmer | 427/389 |
| 3,705,132 | 12/1972 | Cuscurida. | |
| 4,013,806 | 3/1977 | Volkert et al. | 427/54 |

FOREIGN PATENT DOCUMENTS 1376839 12/1974 United Kingdom.

OTHER PUBLICATIONS

Abstract for French 2,145,389, dated Feb. 1973.

Primary Examiner—Ronald H. Smith
Assistant Examiner—Thurman K. Page
Attorney, Agent, or Firm—Gene Harsh; Lawrence S. Pope; Thomas W. Roy

[57] ABSTRACT

The present invention relates to moisture-hardening one-component lacquers having improved shelf life and thermal stability. These lacquers are characterized by high gloss and high flexural strength and are based on reaction products containing free isocyanate groups of relatively high molecular weight polyols having an average functionality of from 2 to 3, polyisocyanates and, optionally, low molecular weight polyhydroxyl compounds which are characterized in that the relatively high molecular weight polyol is a mixture of:

(a) a hydroxyl polyester having an average molecular weight of from about 500 to 6000,
(b) a hydroxyl polyether corresponding to the following general formula:

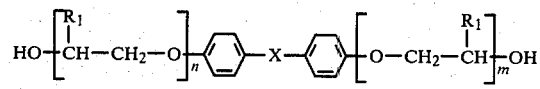

wherein
$R_1$ represents hydrogen, a $C_1$-$C_4$ alkyl radical or a phenyl radical,
X represents one of the difunctional radicals —S—, —O—, —SO$_2$—, —CO— or —C($R_2R_3$)— where $R_2$ and $R_3$, which may be the same or different, represent hydrogen or a $C_1$-$C_4$ alkyl radical, and
n and m each represent an integer of 0, the value of (n+m) being selected in such a way that the hydroxyl polyether has an average molecular weight of from about 300 to 1200. The present invention also relates to processes for the coating of substrates, particularly leather, and the coated substrates produced therefrom.

14 Claims, No Drawings

MOISTURE HARDENING ONE-COMPONENT LACQUERS AND A PROCESS FOR COATING LEATHER

BACKGROUND OF THE INVENTION

1. Field of the Invention

This invention relates to polyurethane lacquers for the grain-masking and high-gloss coating of leather.

2. Description of the Prior Art

In addition to dressings which protect leather and favorably modify its properties without influencing its character, the leather industry also uses lacquers which are intended visibly to alter or even mask the grain surface of the leather. Lacquer layers such as these were originally applied solely to black leather and were intended to emphasize the depth of its black color and to provide the leather with a high-gloss surface. Nowadays, this method of finishing leather is widely used for decorative purposes.

Accordingly, the coating materials used must satisfy increasingly more stringent requirements. As in many other fields involving surface finishing, polyurethanes ("PUR") also occupy a leading position among leather lacquers because of their outstanding properties.

For some considerable time, leather has been universally lacquered using PUR lacquers based on two-component systems. In two-component systems, a mixture of polyisocyanates and polyhydroxyl compounds is initially applied, the actual polyurethane being directly produced on the surface of the leather on completion of coating. Hitherto, it has only been possible by this process to produce high-gloss films using hydroxyl polyesters. This process is also attended however, by serious disadvantages:

(1) The pot life of the mixture of the isocyanate and hydroxyl compound is limited and the flow properties gradually change on standing.

(2) During the drying of the lacquer layers, the moisture in the surrounding atmosphere often has an unpredictable effect on the properties of the lacquered leather.

(3) The polyurethane layers applied frequently show inadequate thermal stability under load which restricts their processing on heat-forming machines.

Accordingly, there has been no shortage of attempts to eliminate these disadvantages. One possible approach is to use air-drying or moisture-drying one-component lacquers which, although capable of virtually indefinite storage in sealed containers, dry quickly after application to leather. Lacquers such as these still contain free isocyanate groups and generally belong to the class of socalled prepolymers.

Accordingly, it was obvious to eliminate the disadvantages of the two-component systems, particularly their inadequate stability in storage, by using reactive one-component lacquers such as these. Efforts in this direction, however, have previously been unsuccessful. More specifically, the known one-component lacquers have the following serious disadvantages:

(1) In contrast to the two-component systems which also contain hydroxyl polyesters, polyester prepolymers leave the final lacquer coating with inadequate gloss and insufficient body and, for this reason, are inferior to the corresponding two-component lacquers.

(2) Although prepolymers containing hydroxyl polyethers show excellent gloss, they also have a property which makes them particularly unsuitable for dark colored leather. Natural and synthetic fats migrate from the leathers through the lacquer to its surface where they form cloudy deposits which reduce gloss and, in addition to lightening its color, leave the leather with an unpleasant feel. This disadvantage cannot be obviated by conventional methods, for example by the addition of silicone compounds.

By virtue of the one-component leather lacquers according to the present invention described in the following, it is now possible to eliminate all these disadvantages and to obtain systems which are in no way inferior to conventional two-component lacquers in regard to their properties and, in addition, show additional advantages in regard to shelf life and processing. This is because it has surprisingly been found that a mixture of hydroxyl polyesters and special hydroxyl polyethers as the polyol component leads to prepolymers which give a coating characterized by high gloss, high flexural strength, excellent body and a sealing effect on leather additives.

SUMMARY OF THE INVENTION

The present invention relates to moisture-hardening one-component lacquers based on reaction products containing free isocyanate groups of relatively high molecular weight polyols having an average functionality of from 2 to 3, polyisocyanates, and optionally, low molecular weight polyhydroxyl compounds which are characterized in that the relatively high molecular weight polyol is a mixture of: (a) a hydroxyl polyester having an average molecular weight of from about 500 to 6000, (b) a hydroxyl polyether corresponding to the following general formula:

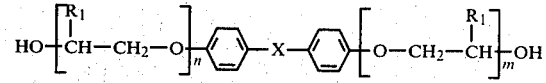

wherein $R_1$ represents hydrogen, a $C_1$–$C_4$ alkyl radical or a phenyl radical, X represents one of the difunctional radicals —S—, —O—, —SO$_2$—, —CO— or —C($R_2R_3$)— where $R_2$ and $R_3$, which may be the same or different, represent hydrogen or a $C_1$–$C_4$ alkyl radical, and n and m each represent an integer of >0, the value of (n+m) being selected in such a way that the hydroxyl polyether has an average molecular weight of from about 300 to 1200, preferably from about 350 to 800, and optionally, (c) another polyether polyol having a molecular weight of from about 500 to 6000, component (b) making up from about 3 to 30% by weight, preferably from about 4 to 20% by weight and component (c) from about 0 to 5% by weight, preferably from about 0.5 to 3% by weight of the total quantity of the relatively high molecular weight polyol.

DETAILED DESCRIPTION OF THE INVENTION

The hydroxyl polyethers (b) are obtained using a known method by the polyaddition of epoxides with starter molecules corresponding to the following general formula:

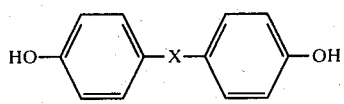

wherein X is defined as above. Preferred starters are those in which X represents

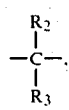

particularly preferred starters being those in which $R_2=R_3=-CH_3$. Examples of suitable epoxides are ethylene oxide, propylene oxide, butylene oxide, styrene oxide or even mixtures of these compounds, propylene oxide being preferred.

The polyesters containing hydroxyl groups used in the production of the lacquers according to the present invention are, for example, reaction products of polyhydric, preferably dihydric and, optionally, even trihydric alcohols, with polybasic, preferably dibasic carboxylic acids. Instead of using the free polycarboxylic acids, it is also possible to use the corresponding polycarboxylic acid anhydrides or the corresponding polycarboxylic acid esters of lower alcohols or mixtures thereof for producing the polyesters, The polycarboxylic acids may be aliphatic, cycloaliphatic, aromatic and/or heterocyclic and may optionally be substituted, for example by halogen atoms, and/or unsaturated.

Examples of carboxylic acids such as these and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid; terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example ε-caprolactone, or of hydroxycarboxylic acids, for example ω-hydroxy caproic acid, may also be used.

The average hydroxyl functionality of these polyesters should not significantly exceed 3 and preferably amounts to between 2 and 3. Tetrafunctional and higher esters are less preferred. The molecular weight of the polyester polyols (a) should amount to between about 500 and 6000, preferably to between about 800 and 3000.

In one preferred embodiment of the present invention, relatively small quantities of a "conventional" hydroxyl polyether (c) are used in addition to the hydroxyl polyesters (a) and the above-described hydroxyl polyethers (b) in the production of the lacquers.

These polyethers which also contain at least two, preferably two or three hydroxyl groups are know per se and are obtained, for example, by polymerizing epoxides, such as ethylene oxide, propylene oxide, butylene oxide, tetrahydrofuran, styrene oxide or epichlorohydrin, on their own, for example in the presence of Lewis catalysts, such as $BF_3$, or by the addition of these epoxides, preferably ethylene oxide and propylene oxide, optionally in admixture or successively, with starter components containing reactive hydrogen atoms, such as water, alcohols, ammonia or amines, for example ethylene glycol, 1,3- or 1,2-propylene glycol, trimethylol propane, glycerol, sorbitol, formitol, aniline, ethanolamine or ethylene diamine.

Preferred polyethers (c) are those which contain a tertiary nitrogen atom. In the production of the one-component lacquer according to the present invention they should be used in quantities not exceeding about 5%, preferably in quantities of less than about 3%, based on the total quantity of relatively high molecular weight polyol.

The isocyanate component for the production of the NCO prepolymers present in the lacquers according to the present invention may be in principle any aliphatic, cycloaliphatic, araliphatic and, preferably, aromatic polyisocyanate known per se of the type described, for example, by W. Siefken in Justus Liebig Annalen der Chemie, 562, pages 75 to 136, for example those corresponding to the following general formula:

$$Q(NCO)_n$$

wherein
n=2–4, preferably 2, and
Q represents an aliphatic hydrocarbon radical containing from 2 to 18, preferably from 6 to 10 carbon atoms, a cycloaliphatic hydrocarbon radical containing from 4 to 15, preferably from 5 to 10 carbon atoms, an aromatic hydrocarbon radical containing from 6 to 15, preferably from 6 to 13 carbon atoms or an araliphatic hydrocarbon radical containing from 8 to 15, preferably from 8 to 13 carbon atoms, for example ethylene diisocyanate, 1,4-tetramethylene diisocyanate, 1,6-hexamethylene diisocyanate, 1,12-dodecane diisocyanate cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3-and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate, naphthylene-1,5-diisocyanate, triphenyl methane-4,4',4''-triisocyanate and polyphenyl polymethylene polyisocyanates, of the type obtained by condensing aniline with formaldehyde, followed by phosgenation, and described, for example, in British Pat. Nos. 874,430 and 848,671.

Modified polyisocyanates, for example reaction products of diisocyanates, such as 2,4- and/or 2,6-diisocyanatotoluene, 1,6-diisocyanatohexane, 1- isocyanato-3-isocyanatomethyl-3,5,5-trimethyl cyclohexane or 4,4'-diisocyanatodicyclohexyl methane and mixtures thereof with triols, such as trimethylol propane, trimethylol ethane, hexane triol or glycerol, polyisocyanates containing isocyanurate groups, for example of the above-mentioned diisocyanates, and the biuret polyisocyanates and allophanate polyisocyanates known per se, may also be used or added to the final prepolymer.

Polyols (preferably diols and triols) having a molecular weight below 300 may also be used in the production of the NCO prepolymer.

The following are mentioned as examples of compounds such as these: ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxy methyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to about 300, dipropylene glycol, polypropylene glycols having a molecular weight of up to 300, dibutylene glycol, higher polybutylene glycols having a molecular weight of up to about 300, 4,4'-dihydroxy diphenyl propane, dihydroxy methyl hydroquinone, diethanolamine, n-methyl diethanolamine, triethanolamine and formitols.

The ratio of NCO to OH groups in the production of the prepolymer should not exceed about 2:1 because, on the one hand, the content of free, physiologically unacceptable aromatic diisocyanate increases with the NCO-/OH equivalent ratio and, on the other, the average molecular weight of the prepolymer which increases with dreasing NCO/OH ratio promotes rapid drying. On the other hand, however, the ratio should as far as possible not fall below about 1.3:1 either, because in that case, the considerable size of the molecules leads to poor levelling and a reduction in gloss. The preferred range for the NCO/OH equivalent ratio is between about 1.6:1 and about 1.8:1. The NCO content of the prepolymers generally amounts to between about 1 and 10% by weight, preferably to between about 2 and 8% by weight.

On particular advantage of the one-component lacquers according to the present invention lies in the fact that they may be applied from highly concentrated solutions. By virtue of the relatively low molecular weight of the isocyanate prepolymers, it is possible to obtain solutions which have viscosities of only about 5000 to 10,000 mPas/25° C. for a concentration of about 70% by weight.

Naturally there are no limits to the dilution of the lacquers according to the present invention. On the other hand, it is possible, providing the starting materials are suitably selected, to reach concentrations of up to about 85% by weight. Apart from the obvious savings in regard to transport, it is preferred for ecological reasons to keep the quantity of solvent as small as possible. Basically, suitable diluents are any solvents which are not reactive to isocyanate groups, for example the aromatic hydrocarbons, ketones and esters known per se and also highly polar solvents, such as dimethyl formamide or N-methyl pyrrolidone, although the latter are less preferred. It is advantageously possible to use mixtures of solvents boiling at different temperatures in order to obtain rapid drying of the lacquers combined with uniform levelling.

The one-component lacquers according to the present invention may also be provided as required with additives, i.e. for example with catalysts known per se to accelerate drying, with the known agents for improving levelling, for example silicone oils or isocyanate prepolymers containing polysiloxanes, or even with dyes or pigments for obtaining particular decorative effects, etc.

The one-component lacquers according to the present invention may be applied by knife-coating, spray coating and casting. They are preferably applied in such quantities that a 200 and 500 μm thick film is formed after drying. It is, of course, also possible however to apply smaller quantities so that the structure of the substrate is still clearly visible beneath a high-gloss finish.

After at most 8 hours, the layer of lacquer is so dry that the lacquered articles may be stacked. It may be several days, however, before the lacquer layer reaches its maximum strength (drying is carried out at temperatures in the range of from 20 to 120° C., but preferably at room temperature). The lacquer layer then shows outstanding gloss and excellent body coupled with high flexural strength and does not adhere to heat-forming machines.

Another particular advantage of the lacquers according to the present invention lies in the fact that, providing they are firmly sealed, containers which have been opened can be stored almost indefinitely and, even after prolonged storage, show the same viscosity and drying speed. In other words, the user no longer has to use up a quantity of lacquer prepared for coating or to regard any of the lacquer which may be left over as a loss.

Although the one-component lacquers according to the present invention, by virtue of their property spectrum, are primarily suitable for coating leather, this does not of course mean that other substrates cannot be coated or lacquered with them. By virtue of their high elasticity, they are particularly suitable for flexible substrates. Substrates such as these include coated flexible sheet-form materials, such as PUR artificial leather, to which the lacquers according to the present invention may be applied as a finish. In addition, paper and cardboard may also be provided with high-gloss coatings using the one-component lacquers according to the present invention. Finally, flexible plastics which may be foamed or compact may also be lacquered using them.

The present invention is illustrated by the following Examples in which the quantities quoted represent parts by weight and percentages by weight, unless otherwise indicated.

EXAMPLE 1

685 parts of a polyester of adipic acid, diethylene glycol and trimethylol propane (OH No. 60), 55 parts of a polypropylene glycol ether started with 2,2-bis-(4-hydroxy phenyl)-propane (OH No. 200), 9 parts of a polypropylene glycol ether started with triethanolamine (OH No. 95), 40 parts of trimethylol propane and 18 parts of 1,3 -butane diol are heated together to 100° C. and dehydrated for 30 minutes at that temperature under a vacuum of approximately 16 Torr.

After cooling to approximately 70° C., 326 parts of 2,4-diisocyanatotoluene are added and the reaction mixture stirred until the NCO content amounts to 5.5%.

The reaction mixture is then diluted with a mixture of 81 parts of xylene and 405 parts of glycol monoethyl ether acetate. After cooling to room temperature, 76 parts of a compound containing isocyanate groups of 11% of bis-hydroxy methyl dimethyl polysiloxane (OH No. 200), 56% of an adduct of 3 moles of 2,4-diisocyanatotoluene and 1 mole of trimethylol propane and 33% of glycol monoethyl ether acetate are added, followed by stirring. The end product has a concentration of 70% and NCO content of 3.4% and a viscosity of approximately 5000 mPas/20° C.

Using an airless spray gun, a film having a wet thickness of approximately 200 μm is applied from the above described lacquer to a leather primed with a commercial black acrylate binder. After drying overnight at room temperature, a dry high-gloss lacquer film is obtained which can be flexed 50,000 times (Bally Flexometer) without damage and which has a surface which is still glossy and clear after 2 weeks.

EXAMPLE 2

1000 parts of a polyester of adipic acid, ethylene glycol and 1,4-butane diol (OH No. 56), 250 parts of the polyether of OH No. 200 described in Example 1 and 50 parts to the polyether of OH No. 95 described in Example 1 are heated together to 100° C. and dehydrated for 30 minutes at that temperature under a vacuum or approximately 16 Torr. After cooling to approximately 60° C., 375 parts of a mixture of 2,4'-diisocyanatodiphenyl methane and 4,4'-diisocyanatodiphenyl methane in a ratio of 60:40 are added, followed by stirring until an NCO content of 1.9% is reached followed by the addition in portions of 577 parts of ethyl acetate.

1707 parts of an adduct of N,N',N''-tris-(3-isocyanato-4-methyl phenyl)-triazintrione and lauryl alcohol in a ratio of 100:9 (50% solution in ethyl acetate) are then added.

The end product has a concentration of 65%, an NCO content of 3.6% and a viscosity of approximately 4000 mPas. Using a reverse-roll coater, a film having a wet thickness of approximately 20 μm is applied to a sheet of printed cardboard and dried for about 1.5 minutes at approximately 80° C. The cardboard is left with a dry, high-gloss film which has high abrasion resistance and flexural strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Moisture-hardening one-component lacquers comprising a reaction product containing free isocyanate groups of a relatively high molecular weight polyol having an average hydroxyl functionality of from 2 to 3 and polyisocyanates, characterized in that the relatively high molecular weight polyol is a mixture comprising
(a) a hydroxyl polyester having an average molecular weight of from about 500 to 6000,
(b) a hydroxyl polyether corresponding to the following general formula:

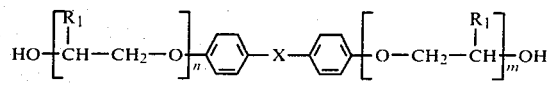

wherein
$R_1$ represents hydrogen, a $C_1$-$C_4$ alkyl radical or a phenyl radical,
X represents one of the difunctional radicals —S—, —O—, —SO$_2$—, —CO— or

where
$R_2$ and $R_3$, which may be the same or different, represent hydrogen or a $C_1$-$C_4$ alkyl radical, and n and m each represent an integer of >0, the value of (n+m) being selected in such a way that the hydroxyl polyether has an average molecular weight of from about 300 to 1200, wherein component (b) makes up from about 3 to 30% by weight of the total quantity of the relatively high molecular weight polyol.

2. The lacquer as claimed in claim 1, characterized in that the relatively high molecular weight polyol additionally comprises:
(c) another polyether polyol having a molecular weight of from about 500 to 6000, wherein component (c) makes up from about 0 to 5% by weight of the total quantity of the relatively high molecular weight polyol.

3. The lacquer as claimed in claim 1 or claim 2, characterized in that component (b) makes up from about 4 to 20% by weight of the total quantity of the relatively high molecular weight polyol.

4. The lacquer as claimed in claim 2, characterized in that component (c) makes up from about 0.5 to 3% by weight of the total quantity of the relatively high molecular weight polyol.

5. The lacquer as claimed in claim 2, characterized in that component (c) is a polyether containing at least one tertiary nitrogen atom.

6. A lacquer as claimed in claims 1 or 2, characterized in that component (b) is a polyether started with bisphenol A.

7. The lacquer as claimed in claims 1 or 2, characterized in that component (b) is a polypropylene oxide polyether.

8. The lacquer as claimed in claims 1 or 2, characterized in that component (a) is an adipic acid polyester.

9. The lacquer as claimed in claims 1 or 2, characterized in that (a) is a polyester having an average hydroxyl functionality of from 2 to 3.

10. The lacquer as claimed in claims 1 or 2, characterized in that the reaction product has a NCO content of from 1 to 10% by weight.

11. A process for the grain-masking highgloss coating of substrates which comprises applying to the substrate a moisture-hardening lacquer from a prepolymer containing isocyanate groups dissolved in solvents inert to isocyanate, characterized in that the lacquer of claim 1 or 2 is used.

12. The process of claim 11, wherein said substrate is leather.

13. The coated substrate prepared by the process of claim 11.

14. The coated leather prepared by the process of claim 12.

* * * * *

UNITED STATES PATENT AND TRADEMARK OFFICE
CERTIFICATE OF CORRECTION

PATENT NO. : 4,289,827
DATED : September 15, 1981
INVENTOR(S) : Klaus Noll, Wolfgang Speicher, Josef Pedain, Rosemarie Schmid It is certified that error appears in the above-identified patent and that said Letters Patent are hereby corrected as shown below:

On the first page of the patent, under

[56] References Cited
U.S. Patent Documents delete "3,247,827" and insert the correct patent number --3,245,827--.

At column 4, line 7, please correct "know" to read --known--.

At column 6, line 14, "200 and 500" should read --200 to 500--.

At column 7, line 29, "or" should be --of--.

At column 8, Claim 11, line 57 "highgloss" should read --high gloss--.

Signed and Sealed this

Twenty-seventh Day of April 1982

[SEAL]

Attest:

GERALD J. MOSSINGHOFF

*Attesting Officer*     *Commissioner of Patents and Trademarks*